United States Patent [19]

Noone et al.

[11] Patent Number: 5,524,673
[45] Date of Patent: Jun. 11, 1996

[54] MULTI-LAYER TUBING HAVING ELECTROSTATIC DISSIPATION FOR HANDLING HYDROCARBON FLUIDS

[75] Inventors: David L. Noone, Marsberg, Germany; Frank L. Mitchell, Rochester, Mich.; Peter Wenig, Marsberg, Germany

[73] Assignee: ITT Corporation, New York, N.Y.

[21] Appl. No.: 234,298

[22] Filed: Apr. 28, 1994

Related U.S. Application Data

[63] Continuation-in-part of Ser. No. 896,824, Jun. 11, 1992, Pat. No. 5,383,087, which is a continuation-in-part of Ser. No. 897,304, Jun. 11, 1992, Ser. No. 897,302, Jun. 11, 1992, Ser. No. 897,376, Jun. 11, 1992, which is a continuation-in-part of Ser. No. 868,754, Apr. 14, 1992, and a continuation-in-part of Ser. No. 962,249, Oct. 16, 1992, abandoned.

[51] Int. Cl.⁶ ...................................... F16L 11/08
[52] U.S. Cl. ..................... 138/103; 138/137; 138/140; 361/215
[58] Field of Search ........................ 137/140, 141, 137/DIG. 2, 103, 109; 361/215; 174/47; 138/137, 125, 126, 127; 156/149; 428/34.9, 36.2, 36.8

[56] References Cited

U.S. PATENT DOCUMENTS

| | | |
|---|---|---|
| 3,070,132 | 12/1962 | Sheridan . |
| 3,473,087 | 10/1969 | Slade . |
| 3,561,493 | 2/1971 | Maillard et al. . |

(List continued on next page.)

FOREIGN PATENT DOCUMENTS

| | | |
|---|---|---|
| 2114550 | 6/1972 | France . |
| 2577168 | 8/1986 | France . |
| 1779905 | 2/1972 | Germany . |
| 3821723 | 9/1989 | Germany . |
| 9001467 | 4/1990 | Germany . |
| 4001125 | 12/1990 | Germany . |
| 4001126 | 12/1990 | Germany . |
| 9007303 | 12/1990 | Germany . |
| 3942354 | 6/1991 | Germany . |
| 4006870 | 7/1991 | Germany . |
| 9400522 | 1/1994 | Germany . |
| 2204376 | 11/1988 | United Kingdom . |
| 2211266 | 6/1989 | United Kingdom . |

OTHER PUBLICATIONS

State of California Air Resources Board, pp. 1-2, A2-A4, B2-B43,, Aug. 9, 1990.

(List continued on next page.)

*Primary Examiner*—James E. Bryant, III
*Attorney, Agent, or Firm*—Robert P. Seitter; J. Gordon Lewis

[57] ABSTRACT

An elongated multi-layer tubing is disclosed for connection to a motor vehicle system to handle fluids containing hydrocarbons. The tubing includes a first layer disposed radially innermost and having an inner surface capable of prolonged exposure to a fluid containing hydrocarbons and an outer surface spaced a first predetermined radial thickness from the inner surface, the first layer consisting essentially of an extrudable, melt-processible thermoplastic. The tubing also includes a second layer having a second predetermined radial thickness at most equal to the thickness of the first layer. The second layer is uniformly and homogeneously connected to or bonded to the first layer and consists essentially of an extrudable, melt-processible thermoplastic capable of sufficiently permanent laminar adhesion with the first layer to prevent delamination during a desired lifetime of the tubing. At least one of the first and second layers is resistant to permeation by hydrocarbons. The tubing includes a third layer having a third predetermined radial thickness greater than the thickness of the first layer. The third layer is capable of sufficiently permanent laminar adhesion to the second layer to prevent delamination during said desired lifetime of said tubing. The third layer is uniformly and homogeneously connected to or bonded to the second layer and consists essentially of an extrudable, melt-processible thermoplastic. At least one layer of the tubing is capable of dissipating electrostatic energy in a range between about $10^{-4}$ to $10^{-9}$ Ohm/cm².

33 Claims, 3 Drawing Sheets

U.S. PATENT DOCUMENTS

| | | |
|---|---|---|
| 3,828,112 | 8/1974 | Johansen et al. . |
| 3,907,955 | 9/1975 | Viennot . |
| 4,059,847 | 11/1977 | Phillips et al. . |
| 4,243,724 | 1/1981 | Strutzel et al. ............................ 138/137 |
| 4,244,914 | 1/1981 | Ranalli et al. ............................ 138/137 |
| 4,272,585 | 6/1981 | Strassel . |
| 4,273,798 | 6/1981 | Scheiber . |
| 4,303,457 | 12/1981 | Johansen et al. . |
| 4,330,017 | 5/1982 | Satoh et al. . |
| 4,448,748 | 5/1984 | Radtke et al. . |
| 4,614,208 | 9/1986 | Skarelius ................................... 138/137 |
| 4,675,780 | 6/1987 | Barnes et al. . |
| 4,685,090 | 8/1987 | Krevor . |
| 4,706,713 | 11/1987 | Sadamitsu et al. ....................... 138/137 |
| 4,762,589 | 8/1988 | Akiyama et al. ......................... 138/137 |
| 4,800,109 | 1/1989 | Washizu .................................... 138/137 |
| 4,853,297 | 8/1989 | Takahashi et al. . |
| 4,880,036 | 11/1989 | Kitami et al. . |
| 4,887,647 | 12/1989 | Igarashi et al. . |
| 4,907,625 | 3/1990 | Ito et al. ................................... 138/137 |
| 4,944,972 | 7/1990 | Blembereg ............................... 138/137 |
| 4,948,643 | 8/1990 | Mueller .................................... 138/137 |
| 4,984,604 | 1/1991 | Nishimura . |
| 4,990,383 | 2/1991 | Bergström et al. . |
| 5,019,309 | 5/1991 | Brunnhofer . |
| 5,038,833 | 8/1991 | Brunnhofer . |
| 5,076,329 | 12/1991 | Brunnhofer . |
| 5,112,692 | 5/1992 | Strassel et al. . |
| 5,142,782 | 9/1992 | Martucci . |
| 5,143,122 | 9/1992 | Adkins . |
| 5,167,259 | 12/1992 | Brunnhofer . |
| 5,170,011 | 12/1992 | Martucci . |
| 5,219,002 | 6/1993 | Stenger et al. ........................... 138/137 |
| 5,219,003 | 6/1993 | Kerschbaumer . |
| 5,284,184 | 2/1994 | Noone et al. . |
| 5,373,870 | 12/1994 | Derroire et al. .......................... 138/137 |
| 5,380,385 | 1/1995 | Derroire et al. .......................... 138/137 |
| 5,383,087 | 1/1995 | Noone et al. ............................. 361/215 |
| 5,425,817 | 6/1995 | Mügge et al. . |

OTHER PUBLICATIONS

Material Safety Data, Advanced Elastomer Systems, pp. 1–5 Santoprene Thermoplastic Rubber FR Grades, Dec. 1, 1990.

Vichem Corporation, Material Safety Data Sheet, May 30, 1990.

Kraton, Processing and Fabricating Kraton Thermoplastic Rubber Compounds, Shell Chemical Company, pp. 1–26, Apr., 1988.

Material Safety Data Sheet, Shell, pp. 1, 3, 5, 1, Aug. 10, 1990.

Sarlink 1000 Series, Material Safety Data Sheet, DSM Thermoplastic Elastomers, Inc., Jan. 14, 1992, pp. 1–4.

Sarlink Thermoplastic Elastomers, The Alternative Tpes, Jan. 14, 1992.

Data Sheet, Sarlink 1570, Fuel Resistant Thermoplastic Elastomer For Marine Hose Applications, Nov., 1989.

Nonmetallic Air Brake System Tubing–SAEJ844, Jun. 1990, SAE Standard.

MULTI-LAYER TUBING HAVING ELECTROSTATIC DISSIPATION FOR HANDLING HYDROCARBON FLUIDS

CROSS REFERENCE TO RELATED APPLICATIONS

This application is a continuation-in-part of U.S. Ser. No. 07/896,824, which was filed on Jun. 11, 1992 and has issued as U.S. Pat. No. 5,383,087 on Jan. 17, 1995, a continuation-in-part of U.S. Ser. No. 07/897,304; U.S. Ser. No. 07/897,302; and U.S. Ser. No. 07/897,376 all filed on Jun. 11, 1992, a continuation-in-part of U.S. Ser. No. 07/868,754 filed on Apr. 14, 1992. This application is also a continuation-in-part of U.S. Ser. No. 07/962,249 filed on Oct. 16, 1992 which has been abandoned.

FIELD OF THE INVENTION

The present invention relates to tubing for use in a motor vehicle. More particularly, the present invention relates to a multi-layer tube which can be employed for transporting hydrocarbon fluids such as a fuel line or vapor recovery line of a motor vehicle.

BACKGROUND OF THE INVENTION

Single layer fuel lines and vapor return lines of synthetic materials such as polyamides have been proposed and employed in the past. Fuel lines employing such materials generally have lengths of at least several meters. It is important that the line, once installed, not materially change during the length of operation, either by shrinkage or elongation or as a result of the stresses to which the line may be subject during use.

It is also becoming increasingly important that the lines employed be essentially impervious to hydrocarbon emissions due to permeation through the tubing. It is anticipated that future Federal and state regulations will fix the limit for permissible hydrocarbon emissions due to permeation through such lines. Regulations which will be enacted in states such as California will fix the total passive hydrocarbon emission for a vehicle at 2 g/m$^2$ per 24 hour period as calculated by evaporative emission testing methods such as those outlined in Title 13 of the California Code of Regulations, section 1976, proposed amendment of Sep. 26, 1991. To achieve the desired total vehicle emission levels, a hydrocarbon permeation level for the lines equal to or below 0.5 g/m$^2$ per 24 hour period would be required. Finally, it is also imperative that the fuel line employed be impervious to interaction with corrosive materials present in the fuel such as oxidative agents and surfactants as well as additives such as ethanol and methanol.

Various types of tubing have been proposed to address these concerns. In general, the most successful of these have been co-extruded multi-layer tubing which employ a relatively thick outer layer composed of a material resistant to the exterior environment. The innermost layer is thinner and is composed of a material which is chosen for its ability to block diffusion of materials, such as aliphatic hydrocarbons, alcohols and other materials present in fuel blends, to the outer layer. The materials of choice for the inner layer are polyamides such as Nylon 6, Nylon 6.6, Nylon 11 and Nylon 12.

Alcohol and aromatics components in the fluid conveyed through the tube diffuse at different rates through the tubing wall from the aliphatic components. The resulting change in the composition of the liquid in the tubing can change the solubility thresholds of the material so as, for example, to be able to crystalize monomers and oligomers of materials, such as Nylon 11 and Nylon 12, into the liquid. The presence of copper ions, which can be picked up from the fuel pump, accelerates this crystallization. The crystallized precipitate can block filters and fuel injectors and collect to limit travel of the fuel-pump or carburetor float as well as build up on critical control surfaces of the fuel pump.

In U.S. Pat. No. 5,076,329 to Brunnhofer, a five-layer fuel line is proposed which is composed of a thick outer layer formed of Nylon 11 or Nylon 12, a thick intermediate layer of Nylon 6, and a thin intermediate bonding layer between and bonded to the intermediate and outer layers formed of a polyethylene or a polypropylene. On the interior of the tube is an inner layer of Nylon 6 with a thin intermediate solvent-blocking layer formed of an ethylene-vinyl alcohol copolymer transposed between. The use of Nylon 6 in the inner fluid contacting surface is designed to eliminate at least a portion of the monomer and oligomer dissolution which occurs with Nylon 11 or Nylon 12.

In U.S. Pat. No. 5,038,833 to Brunnhofer, a three-layer fuel line is proposed in which a tube is formed having a co-extruded outer wall of Nylon 11 or Nylon 12, an intermediate alcohol barrier wall formed from an ethylene-vinyl alcohol copolymer, and an inner water-blocking wall formed from a polyamide such as Nylon 11 or Nylon 12. In DE 40 06 870, a fuel line is proposed in which an intermediate solvent barrier layer is formed of unmodified Nylon 6.6 either separately or in combination with blends of polyamide elastomers. The internal layer is also composed of polyamides; preferably modified or unmodified Nylon 6 while the outer layer is composed of either Nylon 6 or Nylon 12.

Another tubing designed to be resistant to alcoholic media is disclosed in UK Application Number 2 204 376 A in which a tube is produced which has a thick outer layer composed of polyamides such as Nylon 6 or 6.6 and/or Nylon 11 or 12 which are co-extruded with an alcohol-resistant polyolefin, a co-polymer of propylene and maleic acid.

Heretofore it has been extremely difficult to obtain satisfactory lamination characteristics between dissimilar polymer layers. Thus all of the multi-layer tubing proposed previously has employed polyamide-based materials in most or all of the multiple layers. While many more effective solvent-resistant chemicals exist, their use in this area is limited due to limited elongation properties, strength and compatibility with Nylon 11 and 12. Additionally, the previous disclosures fail to address or appreciate the phenomenon of electrostatic discharge.

Electrostatic discharge can be defined as the release of electric charge built up or derived from the passage of charged particles through a medium or conduit composed of essentially non-conductive materials. The electrostatic charge is repeatedly replenished with the passage of additional volumes of fuel through the conduit. Discharge repeatedly occurs in the same localized area gradually eroding the area and leading to eventual rupture of the tubing. Such a rupture of the tubing can lead to the danger of fire and explosion of the flammable contents of the tubing.

Thus it would be desirable to provide a tubing material which could be employed in motor vehicles which would be durable and prevent or reduce permeation of organic materials therethrough. It would also be desirable to provide a tubing material which would be essentially nonreactive with components of the liquid being conveyed therein. Finally, it would be desirable to provide a tubing material which would be capable of preventing the build-up of electrostatic discharge therein or would be capable of safely dissipating any electrostatic charge induced therein.

SUMMARY OF THE INVENTION

The present invention is a multi-layer tube for connection to a motor vehicle system to transport fluids containing hydrocarbons such as in a fuel line, a vapor return line or vapor recovery line. The elongated multi-layer tube of the present invention includes a first layer disposed radially innermost and having an inner surface capable of prolonged exposure to a fluid containing hydrocarbons and an outer surface spaced a first predetermined radial thickness from the inner surface. The first layer consists essentially of an extrudable, melt-processible thermoplastic. A second layer has a second predetermined radial thickness equal to or less than the thickness of the first layer. The second layer is bonded to the outer surface of the first layer and consists essentially of an extrudable, melt processible thermoplastic capable of sufficiently permanent laminar adhesion with the outer surface of the first layer. A third layer has a third predetermined radial thickness greater than the thickness of the first layer. The third layer has an inner face capable of sufficiently permanent laminar adhesion to the second layer and an outer face. The third layer consists essentially of an extrudable, melt-processible thermoplastic. At least one layer of the multi-layer tube is capable of dissipating electrostatic energy in a range between about $10^{-4}$ to $10^{-9}$ Ohm/cm$^2$.

DESCRIPTION OF THE DRAWINGS

The objects, features and advantages of the present invention will become more readily apparent from the following description, reference being made to the following drawings in which.

DESCRIPTION OF THE PREFERRED AND ALTERNATIVE EMBODIMENTS

Figure 1:
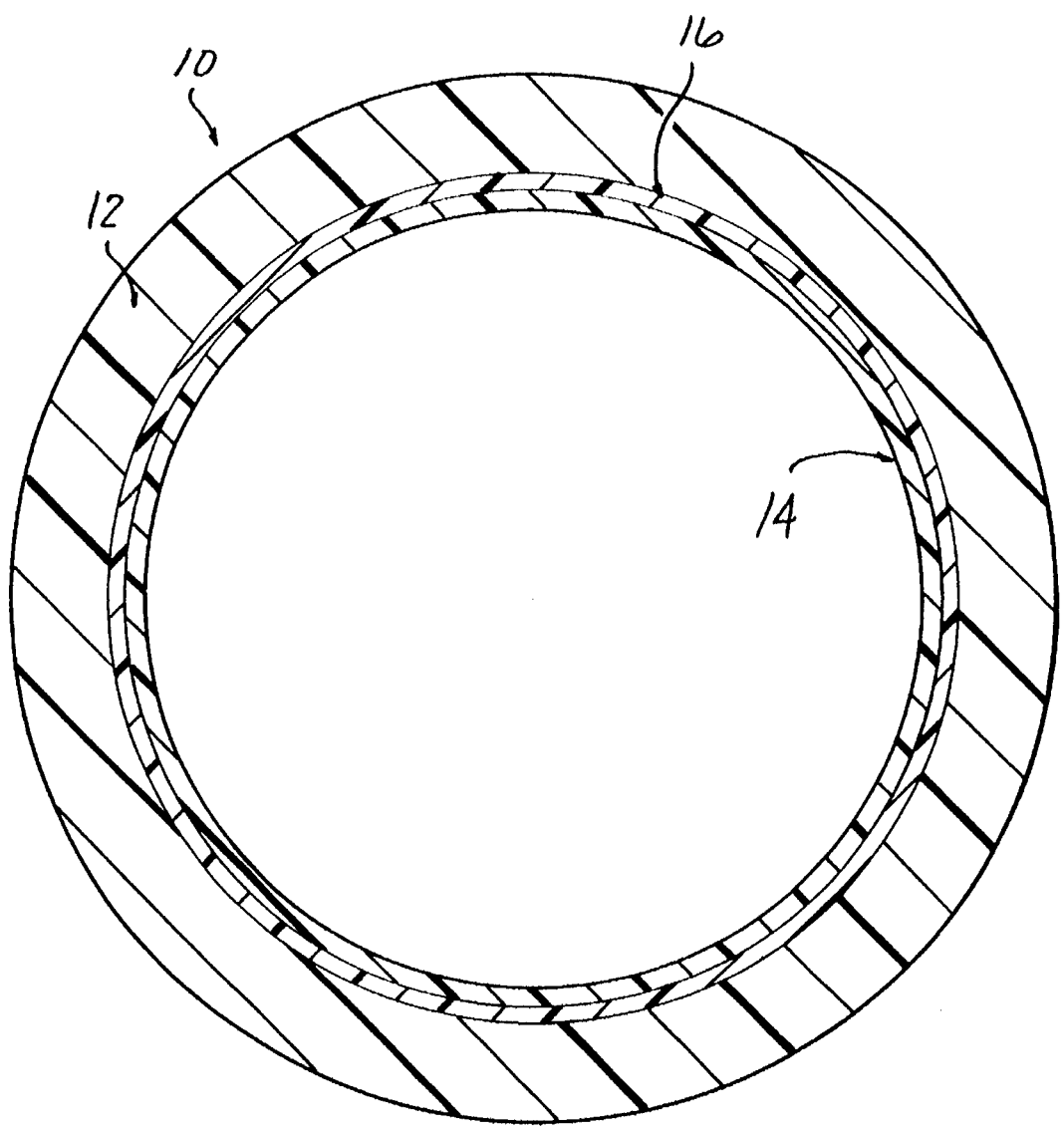
FIG. 1 is a sectional view through a piece of tubing having three layers according to the present invention.
Figure 2:
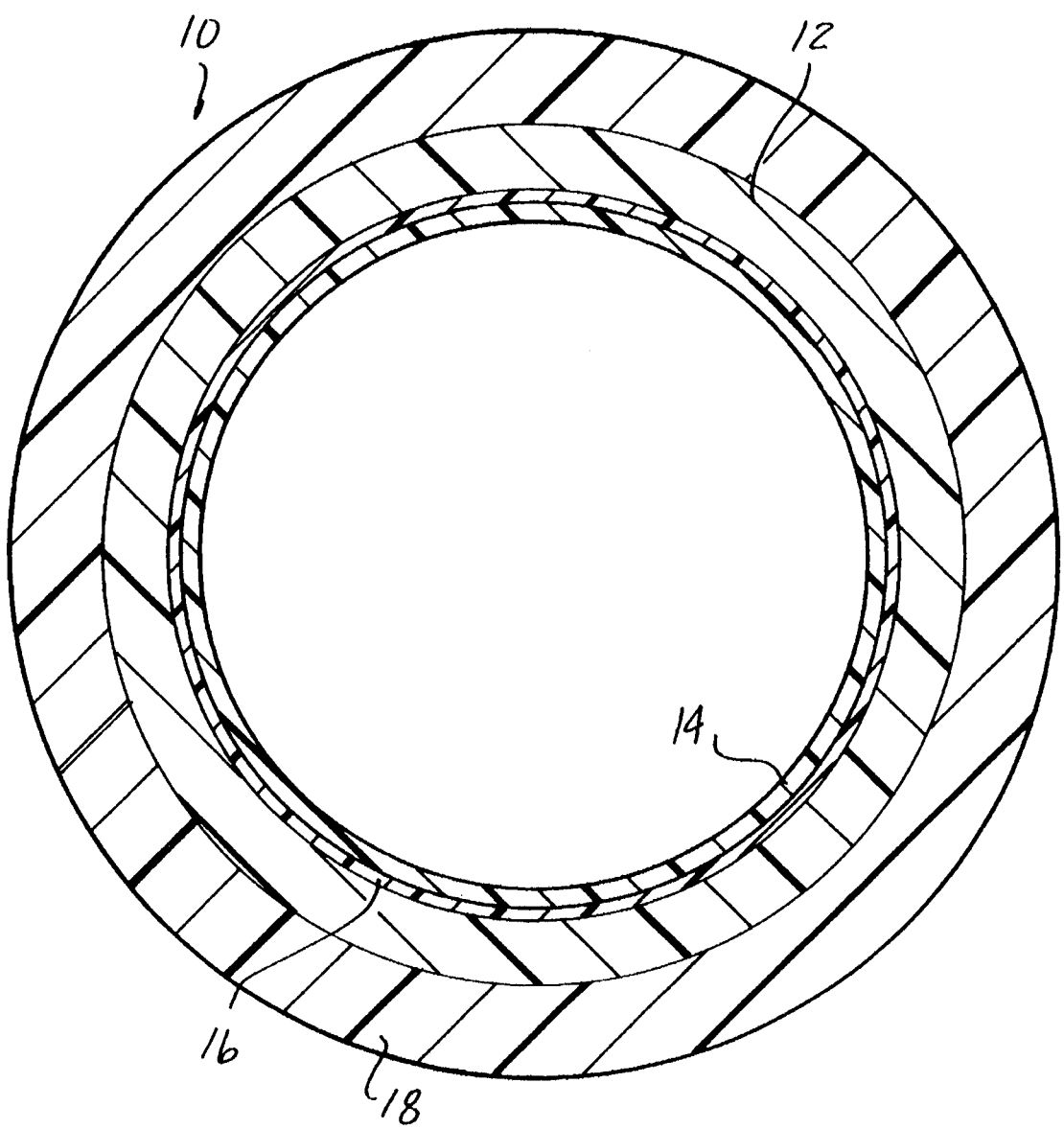
FIG. 2 is a sectional view through a piece of tubing having four layers according to the present invention.

The present invention is a multi-layer fuel line and vapor tube 10 which contains at least an inner or first layer 14, at least one bonding or second layer 16 and at least an outer or third layer 12. The tubing 10 of the present invention is, preferably, fabricated by co-extruding given thermoplastic materials in a conventional co-extrusion process. The tubing 10 may either be co-extruded to a suitable length or may be co-extruded in continuous length and cut to fit the given application subsequently. The tubing 10 of the present invention may have an outer diameter up to 50 mm. However, in applications such as fuel lines and vapor recovery systems, outer diameters of up to 63.5 mm (2.5 inches) are preferred.

The material may have any suitable wall thickness desired. However, in automotive systems such as those described herein, wall thicknesses between 0.5 mm and 2 mm are generally employed with wall thicknesses of approximately 0.8 mm to approximately 1.5 mm being preferred; and wall thicknesses between about 0.8 mm and about 1.25 mm being most preferred. While it is within the scope of this invention to prepare a tubing material having a plurality of overlaying layers of various thermoplastic materials, the tubing 10 of the present invention generally has a maximum of five layers inclusive of the bonding layers. In the preferred embodiment, the tubing material has three or four layers.

The tubing 10 of the present invention is a material which is suitable for use in motor vehicles and comprises a relatively thick outer layer which is non-reactive with the external environment and can withstand various shocks, vibrational fatigue, and changes in temperature as well as exposure to various corrosive or degradative compounds to which it would be exposed through the normal course of operation of the motor vehicle. Suitable materials for use in the present invention may be composed of any melt-processible extrudable thermoplastic material which is resistant to ultra violet degradation, extreme changes in heat and exposure to gasoline and its additives. The material of choice may also exhibit resistance to environmental hazards such as exposure to zinc chloride, and resistance to degradation upon contact with materials such as engine oil and brake fluid.

It is anticipated that both the outer layer, as well as any interior layers bonded thereto, would be suitable for use at an outer service temperature range between about −40° C. and about 150° C., with a range of −20° C. to 120° C. being preferred. The various layers of the tubing 10 are integrally laminated to one another and resistant to delamination throughout the lifetime of the tubing. The tubing 10 thus formed will have a tensile strength of no less than 25 N/mm$^2$ and an elongation value at break of at least 150%. The tubing 10 will have a burst strength at 23° C. and 120° C. of at least 20 bar. The multi-layer tubing 10 of the present invention is sufficiently resistant to exposure to brake fluid, engine oil and peroxides such as those which may be found in gasoline. The multi-layer tube 10 has the capability of withstanding impacts of at least 2 foot-pounds at temperatures below about −20° C. The method for determining impact resistance for tubing as used with respect to the present invention is SAE J844 (revised June 1990) paragraph 9.11 which express impact resistance as foot-pounds.

The total wall thickness of the tubing 10 of the present invention is generally between about 0.5 mm and about 2.0 mm with a wall thickness between about 0.8 mm and about 1.25 mm being preferred.

In the first, second and third embodiments of the present invention, the inner layer 14 is integrally bonded to the inner surface of the thick outer polyamide layer 12. In the present invention, the inner layer 14 is a chemically dissimilar, permeation resistant, chemical resistant, fuel resistant thermoplastic material which is melt processible in normal ranges of extrusion, i.e. about 175° C. to about 250° C. By the term "chemically dissimilar" it is meant that the inner layer 14 consists essentially of a non-polyamide material which is capable of adhesion to a bonding layer 16 interposed between the thick outer layer 12 and the inner layer 14 in a manner which will be described subsequently.

In each of the first, second, third and fifth embodiments, the thermoplastic material which comprises the inner layer 14 is a fluoroplastic material selected from the group consisting of polyvinylidine fluoride, polyvinyl fluoride, polychlorotrifluoroethylene, ethylene tetrafluoroethylene copolymers, a graft copolymer of the preceding materials together with a fluorine-containing polymer such as copolymers of vinylidine fluoride and chlorotrifluoroethane, and mixtures thereof.

In each of the first, second, third and fifth embodiments, the inner layer 14 has a minimum wall thickness sufficient to achieve the permeation resistance desired. In general, the inner layer 14 is thinner than the outer layer 12 with the thickness of the outer layer 12 being between about 50% and about 60% of the total wall thickness of the multi-layer tubing 10. Preferably, the inner wall thickness is between about 0.01 mm and about 0.2 mm with a thickness of about 0.05 mm and about 0.2 mm being preferred and a thickness between about 0.05 mm and about 0.17 mm being most preferred. The intermediate bonding layer 16 generally may have a thickness less than or equal to that of the inner layer 14.

The thermoplastic material employed in the inner layer 14 of the first, second, third and fifth embodiments is capable of serving as a hydrocarbon barrier to prevent significant permeation of the aromatic and aliphatic components of gasoline through to the polyamide outer layer 12 of the tubing 10 and thus, out to the surrounding environment.

The fluoroplastic material employed in the inner layer 14 of the first, second, third and fifth embodiments of the present invention is, preferably, chemically dissimilar in structure and composition from the outer layer 12. In order to accomplish effective lamination of the two dissimilar materials, the tubing 10 of the present invention also includes at least one intermediate layer 16 interposed between the two previously described layers and co-extruded therewith which is capable of achieving a suitable homogeneous bond between itself and the two respective layers. The intermediate bonding layer 16 is generally composed of a more elastic material than that employed in the inner layer 14.

In the first embodiment of the inner layer 14, it is preferred that the fluoroplastic material be selected from the group consisting of polyvinylidine fluoride, polyvinyl fluoride, and mixtures thereof. In the first embodiment, the thermoplastic material which comprises the inner layer 14 is, preferably, a polyvinylidine fluoroplastic derived from the thermal dehalogenation of chlorodifluoroethane commercially available under the tradenames "FLORAFLON" and "KYNAR" from Atochem Inc. elf Aquitaine Group of Philadelphia, Pa.

In the second embodiment of the inner layer 14, it is preferred that the fluoroplastic material be selected from the group consisting of polychlorotrifluoroethylene, ethylene tetrafluoroethylene copolymers, and mixtures thereof. In the second embodiment of the inner layer 14, the preferred material is an ethylene tetrafluoroethylene copolymer having a melt temperature between about 270° C. and 560° C. and a specific gravity of 1.7. The ethylene tetrafluoroethylene copolymer employed herein is derived from the copolymerization of ethylene with tetrafluoroethylene. The preferred polymeric material has an ethylene-derived content between about 40% and about 70% and a tetrafluoroethylene content between about 30% and about 60% by total polymer weight with minor amounts of proprietary materials being optionally present. Suitable materials are commercially available under the tradenames "TEFZEL 210", "TEFZEL 200", and "TEFZEL 280" from E.I. dupont de Nemours, Co. of Wilmington, Del.

In the third embodiment, the thermoplastic material which comprises the inner layer 14 is a fluoroplastic material selected from the group consisting of polychlorotrifluoroethylene, ethylene tetrafluoroethylene copolymers and mixtures thereof. The material employed will, preferably, have a melt temperature between about 270° C. and 560° C. and a specific gravity of 1.7. Suitable polychlorotrifluoroethylene fluoroplastic materials may be derived from the pyrolysis of chlorodifluoromethane. It is believed that suitable ethylene tetrafluoroethylene copolymers broadly have ethylene-derived contents between about 40% and about 70%; tetrafluoroethylene contents between about 30% and about 60% by total polymer weight; and minor amounts of proprietary materials. Suitable materials are commercially available under the tradenames "TEFZEL 210", "TEFZEL 200", and "TEFZEL 280" from E.I. dupont de Nemours, Co. of Wilmington, Del.

In the fourth embodiment, the thermoplastic material employed in the inner layer 14 of the present invention is a melt-processible extrudable thermoplastic material resistant to extreme changes in heat and exposure to chemical components such as are found in engine oil and brake fluid. The thermoplastic material of choice is, preferably, a material chemically similar in structure and composition to the thermoplastic material employed in the thick outer layer 12. As used herein, the term "chemically similar material" is defined as a thermoplastic material selected from the group consisting of 12 carbon block polyamides, 11 carbon block polyamides, zinc chloride resistant 6 carbon block polyamides, thermoplastic elastomers, and mixtures thereof. The thermoplastic elastomers which can successfully be employed in the tubing 10 of the present invention are commercially available under tradenames such as: SANTOPRENE®, a thermoplastic rubber commercially available from Advanced Elastomer Systems of St. Louis, Mo.; KRATON®, a thermoplastic rubber composed of a styrene-ethylene/butylene-styrene block copolymer commercially available from Shell Chemical Co. of Houston, Tex.; SARLINK, an oil resistant thermoplastic commercially available from Novacor Chemicals of Leominster, Mass.; and VICHEM, a family of polyvinyl chloride compounds commercially available from Vichem Corporation of Allendale, Mich.

The thermoplastic material employed in the inner layer 14 of the fourth embodiment of the tubing 10 either may be identical to the material employed in the thick outer layer 12 or may be a different thermoplastic selected from those listed to take advantage of specific properties of the various thermoplastics. In the preferred embodiment, the inner layer 14 is composed of a material similar to or identical to the thick outer layer 12. In the preferred embodiment, a polyamide such as Nylon 12 can be effectively employed.

The thermoplastic employed in the inner layer 14 of the fourth embodiment may be either modified or unmodified. If modified, it is anticipated that the material will contain various plasticizers as are readily known in the art. In the preferred embodiment, the polyamide will contain up to 17% by composition weight plasticizer; with amounts between about 1% and about 13% being preferred.

The inner layer 14 of the fourth embodiment may have a thickness sufficient to supply strength and chemical resistance properties to the multi-layer tubing. Specifically, the inner layer 14 is of sufficient thickness to impede permeation of aliphatic and aromatic hydrocarbon molecules and migration of those molecules through to the thick outer layer. In the present invention, the inner layer has a wall thickness less than that of the thick outer layer. In the preferred embodiment, the inner layer has a wall thickness between about 10% and 25% that of the outer layer; preferably less than between about 0.05 mm and about 0.4 mm; with a wall thickness between about 0.1 mm and about 0.3 mm being preferred.

In order to accomplish effective lamination of the two thermoplastic materials which compose the inner and outer layers of the fourth embodiment, the tubing of the present invention also includes at least one intermediate layer 16 interposed between the two previously described layers and co-extruded therewith which is capable of achieving a suitable homogeneous bond between itself and the two respective layers. The intermediate bonding layer 16 is generally composed of a more elastic material than that employed in the inner layer 14.

In the fifth embodiment, the inner or first layer 14 is integrally bonded to the thick polyamide outer or third layer 12 by means of the intermediate bonding or second layer 16. In the present invention, the inner layer 14 is a chemically dissimilar permeation resistant, chemical resistant, fuel resistant thermoplastic material which is melt-processible in normal ranges of extrusion, i.e. about 175° C. to about 250° C. By the term "chemically dissimilar" it is meant that the inner layer 14 is a non-polyamide material which is capable of adhesion to the intermediate bonding layer 16 interposed between the thick outer layer 12 and the inner layer 14.

In the fifth embodiment, the thermoplastic material which comprises the inner layer 14 is selected from the group consisting of polyvinylidine fluoride, polyvinyl fluoride, and mixtures thereof. The material can also be a graft copolymer of the preceding materials together with a fluorine-containing polymer such as copolymers of vinylidine fluoride and chlorotrifluoroethane. Suitable material employed would contain between about 60% and about 80% by weight polyvinylidine difluoride. Materials so formed have a melting point between about 200° C. and about 220° C. and a molding temperature between about 210° C. and about 230° C.

Figure 3:
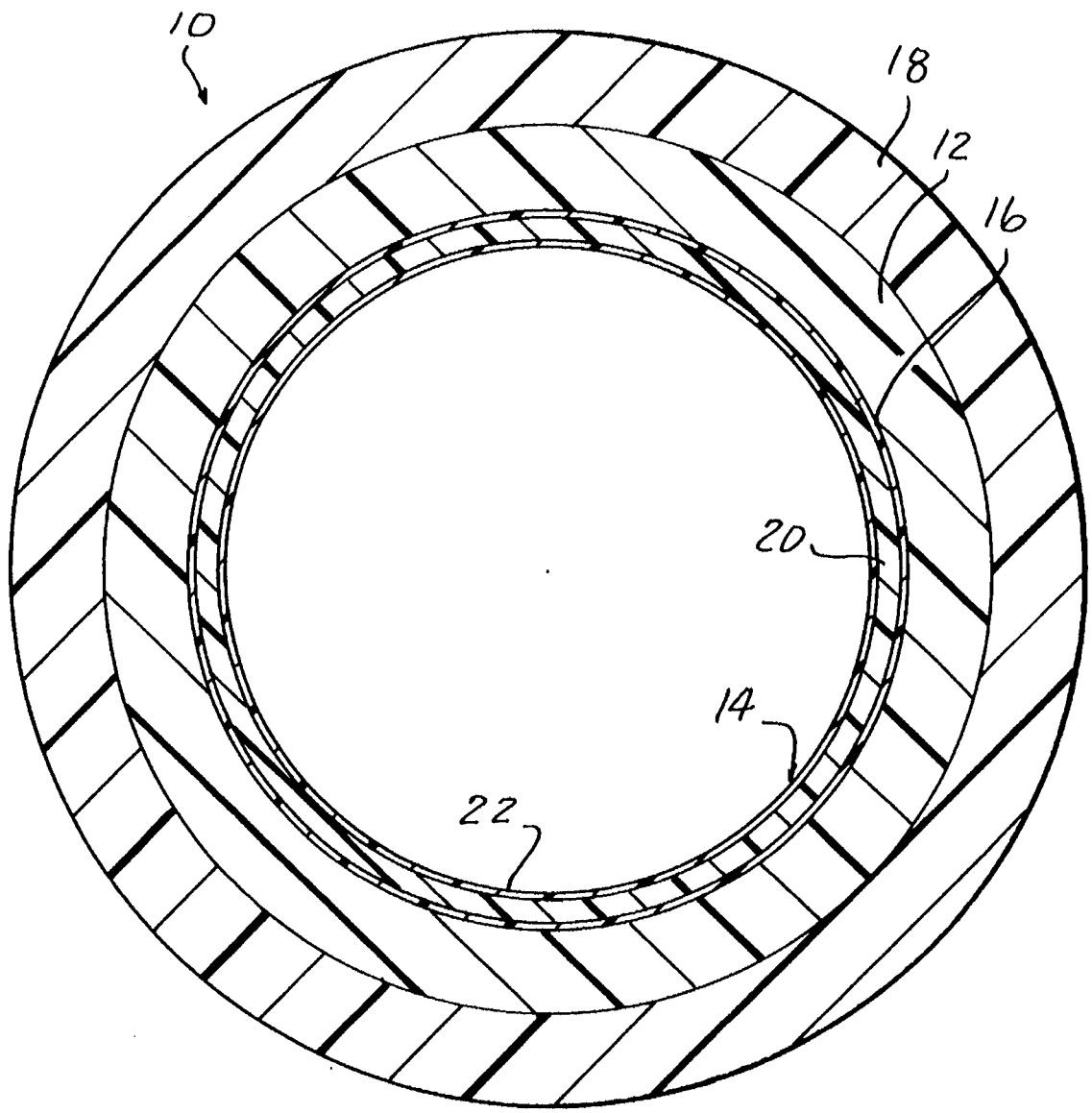
FIG. 3 is a sectional view through a piece of tubing having five layers according to the present invention.

The inner layer 14 of the present invention according to the fifth embodiment, as illustrated in FIG. 3, may include an innermost electrostatic dissipation sub-layer 22 which is also capable of serving as a hydrocarbon barrier to assist in the prevention of permeation of aromatic and aliphatic compounds found in gasoline through to the outer layer 12 of the tubing 10 and, thus, out to the surrounding environment.

In the fifth embodiment, the electrostatic dissipation sub-layer 22 of the inner layer 14 may be integrally bonded to the inner surface of an optional sub-layer 20 disposed between sub-layer 22 and the intermediate bonding layer 16. Preferably, the sub-layers 20 and 22 are chemically similar materials in structure and composition. As used here, the term "chemically similar material" is defined as a thermoplastic material selected from the group consisting of polyvinylidine fluoride, polyvinyl fluoride, a graft copolymer of the preceding materials together with a fluorine-containing polymer such as copolymers of vinylidine fluoride and chlorotrifluoroethane, a copolymer of a vinyl fluoride and chlorotrifluoroethylene, the vinyl fluoride material selected from the group consisting of polyvinylidine fluoride, polyvinyl fluoride, and mixtures thereof; a copolymer of vinyl fluoride material and ethylene tetrafluoroethylene; and a non-fluorinated elastomer, and mixtures thereof. Preferably, the sub-layers 20 and 22 are composed of the same material, with the exception of the electrostatic dissipation sub-layer 22 including additional conductive material as described hereinafter. The sub-layers 20 and 22, intermediate bonding layer 16, outer layer 12 and jacket 18 define a five layer tubing 10. In the present invention, the inner layer 14 is composed of a thermoplastic material chemically dissimilar to the thermoplastic material employed in the outer layer 12 which is melt-processible in the normal ranges of extrusion, i.e. about 175° C. to about 250° C. The thermoplastic material employed in the inner layer 14 is capable of sufficiently permanent laminar adhesion to the intermediate bonding layer 16.

In the fifth embodiment, the thermoplastic material which comprises the electrostatic dissipation sub-layer 22 of the inner layer 14 consists essentially of: a copolymer of a vinyl fluoride and chlorotrifluoroethylene, the vinyl fluoride material selected from the group consisting of polyvinylidine fluoride, polyvinyl fluoride, and mixtures thereof; a copolymer of vinyl fluoride material and ethylene tetrafluoroethylene; and a non-fluorinated elastomer. The thermoplastic material employed in the present invention, preferably contains between about 10% and about 18% by weight of a vinylidine fluoride-chlorotrifluoroethylene copolymer which itself has a vinylidine fluoride content between about 40% and 60% by copolymer weight. The material also, preferably contains between about 50% and about 70% by weight of a vinylidine fluoride-tetrafluoroethylene copolymer. The non-fluorinated elastomer is selected from the group consisting of polyurethanes, and mixtures thereof. In the fifth embodiment, the material contains between about 10% and about 25% by weight polyurethane.

The material according to the fifth embodiment, also contains conductive media in quantities sufficient to permit electrostatic dissipation in a desired range. In the fifth embodiment, the electrostatic dissipation sub-layer 22 of the inner layer 14 exhibits electrostatic conductive characteristics capable of dissipating electrostatic charges in the range of $10^{-4}$ to $10^{-9}$ Ohm/cm$^2$. Suitable material is commercially available under the tradename XPV-504KRC CEFRAL SOFT CONDUCTIVE.

In the fifth embodiment, the electrostatic dissipation sub-layer 22 of the inner layer 14 is maintained at thicknesses suitable for achieving static dissipation and suitable laminar adhesion respectively; generally between about 10% and 20% of the thick outer layer 12. The thickness of the electrostatic dissipation sub-layer 22 of the inner layer 14 is preferably between about 0.1 mm and about 0.2 mm. The intermediate bonding layer 16 preferably has a thickness approximately equal to the thickness of the electrostatic dissipation sub-layer 22, preferably between about 0.05 mm and about 0.15 mm.

In the fifth embodiment, the inner layer 14 is maintained at a thickness suitable to achieve a hydrocarbon permeation value for the tubing 10 of the present invention no greater than about 0.5 g/m$^2$ in a 24 hour interval. To accomplish this, the characteristics of the inner layer 14 can be relied upon solely or in concert with the intermediate bonding layer 16. It is anticipated that the thickness of the inner layer 14 and the intermediate bonding layer 16 can be modified to accomplish this end. In the fifth embodiment, the inner layer 14 has a thickness between about 10% and about 20% of the thick outer layer 12. In the fifth embodiment, the inner layer 14 has a thickness between about 0.15 mm and about 0.25 mm with a thickness of about 0.18 mm to about 0.22 mm being preferred. The intermediate bonding layer 16 is maintained at a thickness sufficient to permit sufficient laminar adhesion between the outer layer 12 and inner layer 14. The intermediate bonding layer 16 generally has a thickness less than that of the inner layer 14. The thickness of the intermediate bonding layer 16 is, preferably, between about 0.05 mm and about 0.1 mm.

In the sixth embodiment, the inner layer 14 is composed of a polyamide thermoplastic derived from the condensation polymerization of caprolactam. Such materials are commonly referred to as a 6-carbon block polyamide or Nylon 6. In the sixth embodiment of the inner layer 14, the 6-carbon block polyamide either inherently exhibits zinc chloride resistance or contains sufficient quantities of modifying agents to impart a level of zinc chloride resistance greater than or equal to that required by Performance Requirement 9.6 as outlined in SAE Standard J844, i.e. non-reactivity after 200 hour immersion in a 50% by weight zinc chloride solution. The Nylon 6 which composes the inner layer 14 of the tubing 10 of the sixth embodiment can also be modified with various plasticizers, flame retardants and the like in manners which would be known to one reasonably skilled in the art. In the sixth embodiment, the 6-carbon block polyamide material is preferably a multi-component system comprised of a Nylon-6 copolymer blended with other Nylons and olefinic compounds. The zinc chloride resistant Nylon-6 of choice will have a melt temperature between about 220° C. and 240° C. Examples of thermoplastic materials suitable for use in the tubing 10 of the present invention are materials which can be obtained commercially under the tradenames M-7551 from NYCOA Corporation and ALLIED 1779 from Allied Chemical.

In the sixth embodiment of the inner layer 14, the 6-carbon block polyamide may, optionally, include other modifying agents such as various plasticizing agents generally present in amounts between about 1.0% and about 13% by total weight of the thermoplastic composition as are readily known in the art. The polyamide material employed, preferably, is an impact-modified material capable of withstanding impacts of at least 2 foot-pounds at temperatures below about −20° C.

In the sixth embodiment, the inner layer 14 has the minimum wall thickness sufficient to achieve the permeation resistance desired. In general, the inner layer 14 is thinner than the outer layer 12 with the thickness of the outer layer 12 being between about 50% and about 60% of the total wall thickness of the tubing 10 or between 55% and 60% of the thickness of the thick outer layer 12. In the specified embodiment, the inner layer 14 wall thickness is between about 0.01 mm and about 0.2 mm with a thickness of about 0.05 mm to about 0.17 mm being preferred. The intermediate bonding layer 16 generally may have a thickness less than or equal to that of the inner layer 14.

In any of the embodiments disclosed, at least one layer, preferably the inner layer 14 and/or the intermediate bonding layer 16, may exhibit conductive characteristics rendering it capable of dissipation of electrostatic charge in the range of $10^{-4}$ to $10^{-9}$ Ohm/cm$^2$. The fluoroplastic material employed in the conductive layer of the present invention may be inherently conductive in these ranges or, preferably, includes in its composition a conductive media in sufficient quantity to permit electrostatic dissipation in the range defined. The conductive media may be any suitable material of a composition and shape capable of effecting this static dissipation. The conductive material may be selected from the group consisting of elemental carbon, stainless steel, highly conductive metals such as copper, silver, gold, nickel and silicon, and mixtures thereof. The term "elemental carbon" as used herein is employed to describe and include materials commonly referred to as "carbon black". The carbon black can be present in the form of carbon fibers, powders, spheres, and the like.

The amount of conductive material contained in the fluoroplastic is generally limited by considerations of low temperature durability and resistance to the degradative effects of the gasoline or fuel passing through the tubing 10. In the preferred embodiment, the fluoroplastic material contains conductive material in an amount sufficient to effect electrostatic dissipation. However, the maximum amount employed therein is less than 5% by volume with a concentration between about 2% and about 4% being preferred.

The conductive material can either be blended into the melt-processible fluoroplastic material so as to be interstitially integrated into the crystalline structure of the polymer or can be incorporated during polymerization of the monomers that make up the fluoroplastic material. Without being bound to any theory, it is believed that carbon-containing materials such as carbon black may be incorporated during co-polymerization of the surrounding fluoroplastic material. Material such as stainless steel are more likely to be blended into the crystalline structure of the polymer.

In each of the embodiments, the intermediate bonding layer 16 is composed of a thermoplastic material which also exhibits properties of resistance to permeation of aliphatic and aromatic materials such as those found in fuel. The thermoplastic material employed herein is preferably a melt-processible co-extrudable thermoplastic which may or may not contain various plasticizers and other modifying agents.

The intermediate bonding layer 16, in addition to permitting a homogeneous bond between the inner layer 14 and outer layer 12, and exhibiting resistance to permeation of fuel components, also may exhibit conductive or static dissipative characteristics such as those described previously. Thus, the intermediate bonding layer 16 may optionally include sufficient amounts of conductive media to effect electrostatic dissipation in the range of $10^{-4}$ to $10^{-9}$ Ohm/cm$^2$. As with the inner layer 14, the intermediate bonding layer 16 may be inherently electrostatically dissipative or may be rendered so by the inclusion of certain conductive material such as those selected from the group consisting of elemental carbon, stainless steel, copper, silver, gold, nickel, silicon and mixtures thereof.

It is preferred that the inner layer 14 and the bonding layer 16 be maintained at the minimum thickness necessary to prevent permeation of the fuel through the tubing material. It is preferred that the amount of hydrocarbon permeation through the tubing 10 be no greater than 0.5 gm/m$^2$ in a 24 hour interval. The thickness of the inner layer 14 can be varied to accomplish this end.

The intermediate bonding layer 16 is of sufficient thickness to permit an essentially homogeneous bond between the inner layer 14 and outer layer 12. In general, the intermediate bonding layer 16 can be thinner than the other two layers and can constitute between about 10% and about 20% of the total wall thickness of the multi-layer tube 10. In the preferred embodiment, the thickness of the intermediate bonding layer 16 is between about 0.01 mm and about 0.2 mm with a thickness between about 0.05 mm and about 0.2 mm being preferred; and a thickness between about 0.05 mm and about 0.15 mm being most preferred.

In the first, second and third embodiments of the present invention, the intermediate bonding layer 16 consists essentially of a fluoroplastic material selected from the group consisting of polyvinylidine fluoride, polyvinyl fluoride, polyvinyl acetate-urethane blends, and mixtures thereof. One preferred fluoroplastic material is a polyvinylidine derived from the thermal dehalogenation of chlorodifluoroethane. One preferred non-fluorocarbon material is a polyvinyl acetate/urethane blend. The material of choice exhibits an affinity to polymers employed in the outer layer such as Nylon 12 or Nylon 6. Suitable fluoroplastic materials are commercially available under the tradename "ADEFLON A"; while suitable non-fluoroplastic materials are commercially available under the tradename "ADEFLON D" both from Atochem Inc. elf Aquitaine Group of Philadelphia, Pa.

In the fourth embodiment of the present invention, the intermediate bonding layer 16 is a chemically dissimilar, permeation resistant, chemical resistant, fuel resistant thermoplastic material which is melt processable in normal ranges of extrusion, i.e. about 175° C. to about 250° C. By the term "chemically dissimilar" it is meant that the intermediate bonding layer 16 is a non-polyamide material which is capable of integral adhesion with and between the thick outer layer 12 and the inner layer 14 as a result of co-extrusion.

In the fourth embodiment, the thermoplastic material which comprises the intermediate bonding layer 16 is a thermoplastic polyester derived from ethylene glycol selected from the group consisting of polybutylene terephthalate, polyethylene terephthalate, polyteremethylene terephthalate, and mixtures thereof. The preferred material is polybutylene terephthalate. Suitable material is commercially available under the tradename 1607 ZE40 from Hüls of Dusseldorf, Germany.

In the fifth embodiment, the intermediate bonding layer 16 is composed of a thermoplastic material which may exhibit properties of resistance to the permeation of aliphatic and aromatic materials such as those found in fuel in addition to exhibiting suitable bonding characteristics. The thermoplastic material employed herein is preferably a melt-processible co-extrudable fluoroplastic blend which will exhibit an infinity to conventional polymers such as Nylon 12, and may optionally contain various plasticizers and other modifying agents. In the fifth embodiment, the fluoroplastic which comprises the intermediate bonding layer 16 consists essentially of: a polyvinyl fluoride compound selected from the group consisting of polyvinylidine fluoride polymers, polyvinyl fluoride polymers, and mixtures thereof; a vinylidine fluoride-chlorotrifluoroethylene copolymer; and a polyamide material selected from the group consisting of 12 carbon block polyamides, 11 carbon block polyamides, 6 carbon block polyamides, and mixtures thereof. The vinylidine fluoride-chlorotrifluoroethylene copolymer preferably, contains between about 60% and about 80% by weight polyvinylidine difluoride. In the fifth embodiment, the intermediate bonding layer 16 consists essentially of between about 35% and about 45% by weight of a copolymer of vinylidine fluoride and chlorotrifluoroethylene; between 25% and about 35% by weight polyvinylidine fluoride; and between about 25% and about 35% by weight of a polyamide selected from the group consisting of 12 carbon block polyamides, 11 carbon block polyamides, and mixtures thereof. One such polymeric material suitable for use in the multi-layer tubing 10 of the present invention is commercially available from Central Glass of Ube City, Japan under the trade designation CEFRAL SOFT XUA-2U. This material is a graft copolymer of a fluorine-containing elastomeric polymer with a fluorine-containing crystalline polymer. The elastomeric polymer is, preferably, a material copolymerized from an alkyl difluoride selected from the group consisting of vinyl difluoride, vinylidine difluoride, and mixtures thereof, and a chlorofluoroalkene selected from the group consisting of ethylene chlorotrifluoroethylene. The crystalline polymer is preferably a haloalkene such as ethylene chlorotrifluoroethylene.

In the fifth embodiment, the bonding layer 16 is the product of the copolymerization of ethylene chlorotrifluoroethylene and a vinylidine difluoride chlorotrifluoroethylene copolymer having a melting point between about 180° C. and about 210° C. and a molding temperature between about 230° C. and about 260° C.

In the sixth embodiment, the intermediate bonding layer 16 is integrally bonded to the inner surface of the thick outer polyamide layer 12. In the present invention, the intermediate bonding layer 16 is a chemically dissimilar permeation resistant, chemical resistant, fuel resistant thermoplastic material which is melt processable in normal ranges of extrusion, i.e. about 175° C. to about 250° C. By the term "chemically dissimilar" it is meant that the intermediate bonding layer 16 consists essentially of a non-polyamide material which is capable of adhesion to act as a bonding agent interposed between the thick outer layer 12 and the inner layer 14 in a manner which will be described subsequently.

In the sixth embodiment, the thermoplastic material which comprises the intermediate bonding layer 16 is a thermoplastic material selected from the group consisting of co-polymers of substituted or unsubstituted alkenes having less than four carbon atoms and vinyl alcohol, alkenes having less than four carbon atoms and vinyl acetate, and mixtures thereof. In the sixth embodiment, the thermoplastic material employed will be resistant to permeation by and interaction with short chain aromatic and aliphatic compounds such as those which would be found in gasoline.

In the sixth embodiment, the preferred material is a copolymer of ethylene and vinyl alcohol which has an ethylene content between about 27% and about 35% by weight with an ethylene content between about 27% and about 32% being preferred. Examples of suitable materials which can be employed in the tubing of the present invention include: ethylene vinyl alcohol commercially available from EVA/LA.

The intermediate bonding layer 16 of the sixth embodiment serves to bond the thick outer layer 12 to the inner layer 14 to form a secure laminar bond therebetween. The inner layer 14 provides a stable fuel-contacting surface on the interior of the tube 10. The intermediate bonding layer 16 is of sufficient thickness to permit an essentially homogeneous bond between the inner layer 14 and outer layer 12. In general, the intermediate bonding layer 16 can be thinner than the other layers and can constitute between about 10% and about 50% of the total wall thickness or between about 20% and about 30% of the thickness of the outer layer 12. In the specified embodiment, the thickness of the intermediate bonding layer 16 is between about 0.01 mm and about 0.25 mm with a thickness between about 0.05 mm and about 0.20 mm being preferred.

The thermoplastic material employed in the intermediate bonding layer 16 of the sixth embodiment is capable of serving as a hydrocarbon barrier to prevent significant permeation of the aromatic and aliphatic components of gasoline through to the polyamide outer layer 12 of the tubing 10 and thus, out to the surrounding environment. The effectiveness of the barrier layer at preventing such permeation will vary depending on numerous factors including but not limited to the thickness and composition of the inner layer 14, the thickness of the bonding layer 16 and the composition of the materials conveyed through the tubing 10. In the sixth embodiment, it is anticipated that the bonding layer 16 will be capable of providing the tubing 10 of the present invention with a passive hydrocarbon permeation level less than about 0.5 $g/m^2$ per 24 hour.

In each of the embodiments, the outer layer 12 has a wall thickness sufficient to provide suitable strength and endurance to the multi-layer tubing 10 of the present invention. Generally, in applications involving automotive vehicles, the outer layer 12 comprises between about 50% and about 70% of the total wall thickness. In general, the outer layer 12 has a wall thickness between about 0.6 mm and about 0.9 mm; with a preferred wall thickness between about 0.7 mm and about 0.8 mm, and a most preferred wall thickness between about 0.7 mm and about 0.75 mm. As indicated previously, the material can be extruded by conventional co-extrusion methods to any continuous length desired.

In general, the outer layer 12 may be composed of any melt-processible extrudable thermoplastic material which is resistant to ultraviolet degradation, extreme changes in heat, exposure to environmental hazards such as zinc chloride, and degradation upon contact with engine oil and brake fluid.

In the first, second, fourth and fifth embodiments, the outer layer 12 is selected from the group consisting of 12 carbon block polyamides, 11 carbon block polyamides, zinc chloride resistant 6 carbon block polyamides, thermoplastic elastomers, and mixtures thereof. The thermoplastic elastomers are commercially available under tradenames such as: SANTOPRENE®, a thermoplastic rubber commercially available from Advanced Elastomer Systems of St. Louis, Mo.; KRATON®, a thermoplastic rubber composed of a styrene-ethylene/butylene-styrene block copolymer commercially available from Shell Chemical Co. of Houston, Tex.; SARLINK, an oil resistant thermoplastic commercially available from Novacor Chemicals of Leominster, Mass.; and VICHEM, a family of polyvinyl chloride compounds commercially available from Vichem Corporation of Allendale, Mich. These materials which compose the outer layer can be present in their unmodified state or can be modified with various plasticizers, flame retardants and the like in manners which would be known to one reasonably skilled in the art. The thermoplastic material of choice has an elongation value at break of at least 150% and an ability to withstand impacts of at least 2 foot-pounds at temperatures below about –20° C.

In the first, second, fourth and fifth embodiments, a polyamide such as Nylon 12 can be effectively employed. It is anticipated that the Nylon 12 may be either modified or unmodified. If modified, it is anticipated that the material will contain various plasticizers as are readily known in the art. Preferably, the polyamide will contain up to 17% by composition weight plasticizer; with amounts between about 1% and about 13% being preferred. The polyamide material employed, preferably, is an impact-modified material capable of withstanding impacts of 2 foot-pounds at temperatures below about –20° C.

In the first, second, fourth and fifth embodiments, the outer layer 12 has a wall thickness sufficient to provide suitable strength and endurance to the multi-layer tubing 10 of the present invention. In applications involving automotive vehicles, the outer layer 12 comprises between about 50% and about 70% of the total wall thickness. In general, the outer layer 12 has a wall thickness between about 0.6 mm and about 0.9 mm; with a preferred wall thickness between about 0.7 mm and about 0.8 mm, and a most preferred wall thickness between about 0.7 mm and about 0.75 mm. In the fourth embodiment, the outer layer 12, preferably, has a wall thickness between about 0.5 mm and about 1.0 mm with a preferred range being between about 0.6 mm and about 0.8 mm. In the fifth embodiment, the Nylon 12 outer layer 12 preferably has a wall thickness between about 0.5 mm and about 0.8 mm with a preferred range being between about 0.6 mm and about 0.75 mm. As indicated previously, the material is extruded by conventional co-extrusion methods to any continuous length desired. As indicated previously, the material can be extruded by conventional co-extrusion methods to any continuous length desired.

In the third and sixth embodiments, the outer layer 12 is composed of a polyamide thermoplastic derived from the condensation polymerization of caprolactam. Such materials are commonly referred to as a 6-carbon block polyamide or Nylon 6. In this third and sixth embodiments, the 6-carbon block polyamide either inherently exhibits zinc chloride resistance or contains sufficient quantities of modifying agents to impart a level of zinc chloride resistance greater than or equal to that required by Performance Requirement 9.6 as outlined in SAE Standard J844, i.e. non-reactivity after 200 hour immersion in a 50% by weight zinc chloride solution. The Nylon 6 which composes the outer layer 12 of the tubing 10 of these embodiments can also be modified with various plasticizers, flame retardants and the like in manners which would be known to one reasonably skilled in the art. In these embodiments, the 6-carbon block polyamide material is preferably a multi-component system comprised of a Nylon-6 copolymer blended with other Nylons and olefinic compounds. The zinc chloride resistant Nylon-6 of choice will have a melt temperature between about 220° C. and 240° C. Examples of thermoplastic materials suitable for use in the tubing 10 of the present invention are materials which can be obtained commercially under the tradenames M-7551 from NYCOA Corporation and ALLIED 1779 from Allied Chemical.

In the third and sixth embodiments, the 6-carbon block polyamide may, optionally, include other modifying agents such as various plasticizing agents generally present in amounts between about 1.0% and about 13% by total weight of the thermoplastic composition as are readily known in the art. The polyamide material employed, preferably, is an impact-modified material capable of withstanding impacts of at least 2 foot-pounds at temperatures below about –20° C.

In the third and sixth embodiments, the outer layer 12 has a wall thickness sufficient to provide suitable strength and endurance to the multi-layer tubing of the present invention. In applications involving automotive vehicles, the outer layer 12 comprises between about 50% and about 60% of the total wall thickness. In general, the outer layer has a wall thickness between about 0.5 mm and about 0.8 mm; with a preferred wall thickness between about 0.6 mm and about 0.7 mm. As indicated previously, the material can be extruded by conventional co-extrusion methods to any continuous length desired.

In any of the disclosed embodiments, the tubing 10 of the present invention may also, optionally include an outer jacket or fourth layer 18 which surrounds the outer or third layer 12. The jacket 18 may be either co-extruded with the other layers during the extrusion process or may be put on in a subsequent process such as cross-extrusion. The outer jacket 18 may be made of any material chosen for its structural or insulating characteristics and may be of any suitable wall thickness. In the preferred embodiment, the outer jacket 18 may be made of a thermoplastic material selected from the group consisting of zinc-chloride resistant Nylon 6, Nylon 11, Nylon 12, polypropylene, and thermoplastic elastomers such as: SANTOPRENE®, a thermoplastic rubber composition commercially available from Advanced Elastomer Systems of St. Louis, Mo.; KRATON®, a thermoplastic rubber composition composed of a styrene-ethylene/butylene-styrene block copolymer commercially available from Shell Chemical Co. of Houston, Tex.; VICHEM, a family of polyvinyl chloride compounds commercially available from Vichem Corporation of Allendale, Mich.; and SARLINK, an oil resistant thermoplastic composition commercially available from Novacor Chemicals of Leominster, Mass. If desired, these materials may be modified to include flame retardants, plasticizers and the like.

In the fourth embodiment of the invention, the outer jacket may, preferably, exhibit conductive characteristics in that it is capable of dissipation of electrostatic charge in the range of $10^{-4}$ to $10^{-9}$ Ohm/cm$^2$. The material which composes the outer jacket may be inherently conductive in these ranges or, preferably, include in its composition a conductive media in sufficient quantity to permit electrostatic dissipation in the range defined. The conductive media may be any suitable material of a composition and shape capable of effecting this static dissipation. The conductive material may be selected from the group consisting of elemental carbon, stainless steel, highly conductive metals such as copper, silver, gold, nickel and silicon, and mixtures thereof. The term "elemental carbon" as used herein is employed to describe and include materials commonly referred to as "carbon black". The carbon black can be present in the form of carbon fibers, powders, spheres, and the like.

The amount of conductive material contained in the outer jacket is generally limited by considerations of low temperature durability and resistance to the degradative effects of the gasoline or fuel passing through the tubing. In the fourth embodiment, the thermoplastic material contains conductive material in an amount sufficient to effect electrostatic dissipation. However, the maximum amount employed therein is preferably less than 5% by volume.

The conductive material can either be blended into the crystalline structure of the polymer or can be incorporated during polymerization of monomers that make up the polymer. Without being bound to any theory, it is believed that carbon-containing materials such as carbon black may be subject to incorporation into the monomer that produces the surrounding thermoplastic material. Materials such as stainless steel are more likely to be blended into the crystalline structure of the polymer.

The following is a brief description of the various exemplary, commercially available compounds described hereinabove. It is to be understood that these are examples of suitable compounds for illustrative purposes. Thus, it is to be further understood that other suitable compounds are contemplated and are within the scope of the present invention.

SANTOPRENE®, commercially available from Advanced Elastomer Systems, L.P. of St. Louis, Mo. is a thermoplastic rubber FR grade. Aside from the thermoplastic rubber, it also contains antimony trioxide flame retardant, and may contain carbon black, CAS No. 1333-86-4. SANTOPRENE® thermoplastic rubber may react with strong oxidizing chemicals, and also reacts with acetal resins at temperatures of 425° F. and above, producing decomposition of the acetal resins, and formaldehyde as a decomposition product. Decomposition of halogenated polymers and phenolic resins may also be accelerated when they are in contact with SANTOPRENE® thermoplastic rubber at processing temperatures. Physical characteristics of SANTOPRENE® include a slightly rubber-like odor, and the appearance of black or natural (colorable) pellets. It is thermally stable to 500° F. The flash ignition temperature is greater than 650° F. by method ASTM-D 1929-77, and by the same method, self-ignition temperature is above 700° F. The typical specific gravity is 0.90 to 1.28. The material has various hardnesses which are suitable in the present invention, however, in the preferred embodiment, the SANTOPRENE® thermoplastic rubber having an 80 Shore A hardness is utilized. The SANTOPRENE® thermoplastic rubber is designed to offer fluid and oil resistance equivalent to that of conventional thermoset rubbers such as neoprene. The resistance of the SANTOPRENE® rubber grades to oils can be classified by using the SAE J200/ASTM D2000 standard classification system for rubber.

ADEFLON A is a polyvinylidene fluoride commercially available from Atochem Inc. elf Aquitaine Group of Philadelphia, Pa. Its typical use is as a binding material for polyamides/polyvinylidene fluoride. The product is stable under normal use conditions, and above 230° C., there is a release of monomer traces. Physical properties include: at 20° C. the material is a granulated solid having a white/ slightly yellow color and no odor. The crystal melting point is 175° C., and beginning of decomposition is 230° C. In water at 20° C., the product is non-soluble. The density at 20° C. bulk is 1 to 1.1 g/cm$^3$.

The Vichem Corporation vinyl compounds are polyvinyl chloride compounds composed of a vinyl resin and functioning additives. The ingredients include a stabilizer, a resin CAS No. 75-01-4, a plasticizer CAS No. 68515-49-1, an epoxy soya oil CAS No. 8013-07-8, a filler CAS No. 1317-65-3 and carbon black CAS No. 1333-85-4. The specific gravity is 1.35 and the compound has the appearance of pellets and has a characteristically bland odor.

KRATON®, commercially available from Shell Chemical Co. of Houston, Tex., is a thermoplastic rubber having a specific gravity of 0.90 to 1.90 and a hardness of 15A to 60D. The tensile strength is up to 2,500 psi. The elongation is up to 750% and the tear strength is up to 750 pli (130 kN/m). The flex modulus is 750 to 100,000 psi. The service temperature is −70° C. to 150° C. The ozone resistance is excellent, UV resistance is excellent, fluid resistance is fair to excellent, and flame resistance is fair to excellent.

SARLINK is a thermoplastic elastomer commercially available from Novacor Chemicals Inc. of Leominster, Mass. The specific gravity ranges from 1.13 to 1.22. The modulus at 100% ranges between 260 and 570 psi. The tensile strength ranges between 780 and 2,060 psi. The ultimate elongation ranges between about 345 and about 395%. The tear strength ranges between about 81 and about 196 pli. The tension set ranges between about 4 and 6%. It has excellent fluid resistance to acids and alkalis, aqueous solutions, organic solvents, petroleum oils and fuels, automotive fluids such as automatic transmission, power steering, etc. and industrial fluids. It has fair fluid resistance to automotive fluids such as hydraulic brake, lithium grease, antifreeze, etc. and poor resistance to organic solvents. The SARLINK product is a solid, black pellet material with a mildly pungent odor. It is insoluble in water at 20° C.

KYNAR, commercially available from Atochem Inc. elf Aquitaine Group of Philadelphia, Pa., is a vinylidene fluoride-hexafluoropropylene copolymer. Its chemical name is 1-propene,1,1,2,3,3,3-hexafluoro-1,1-difluoroethene polymer. Its melting point is 155°–160° C. Its specific gravity is 1.77–1.79 at 23° C. It appears translucent and has no odor.

A suitably conductive KYNAR material, known as KYNAR RC 10,098 is also commercially available from Atochem Inc. elf Aquitaine Group of Philadelphia, Pa. This compound is identified as a hexafluoropropylene-vinylidine fluoride copolymer, CAS No. 9011-17-0. The melting point is between about 155° C. and about 160° C. It is not soluble in water. It appears as translucent pellets having no odor. It is stable under 300° C.

CEFRAL SOFT XUA-2U, commercially available from Central Glass Company, Ltd., Chiyodaku, Tokyo, Japan is a copolymer containing 40% vinylidene fluoride-chlorotrifluoroethylene copolymer, 30% polyvinylidene fluoride and 30% Nylon 12. The material has a specific gravity of 1.45 at 23° C., a melting point of 173° C. and a mold temperature of 220° F. The material has an elongation at break of 478% and a tensile strength of 430 Kgf/cm$^2$.

XPV-504 KRC CEFRAL SOFT CONDUCTIVE is commercially available from Central Glass Company, Ltd., Chiyodaku, Tokyo, Japan and is a polymeric composition containing 14% vinylidene fluoride-chlorotrifluoroethylene copolymer; 63% vinylidene fluoride-tetrafluoroethylene copolymer; 20% polyurethane elastomer; and 3% carbon black. The material has a melt point of 165° C. and a specific gravity of 1.80 at 23° C.

TEFZEL is commercially available from DuPont Polymers, Specialty Polymer Division, Wilmington, Del. The material designates a family of ethylene tetrafluoroethylene fluoropolymers having various commercial grades. The material has a melting point between 255° C. and 280° C. as determined by ASTM method DTA D3418. The specific gravity for the material is between 1.70 and 1.72 as determined by ASTM method D792. Impact strength for the material at −65° F. is between 2.0 ft-lbs/inch and 3.5 ft-lbs/inch as determined by ASTM method D256, commonly referred to as Notched Izod Impact Strength. The hardness durometer as determined by ASTM method D2240 for all grades of TEFZEL is D70. Tensile strength at 73° F. is between 5,500 psi and 7,000 psi. TEFZEL was first introduced in 1970 having outstanding mechanical strength, high temperature and corrosion resistance. The material is available in three production grades, TEFZEL 200, TEFZEL 210 and TEFZEL 280 which can be applied in the present invention. Ultimate elongation at break is between 150% and 300%, depending on the grade as determined by ASTM method D638.

In summary, the first embodiment of the multi-layer tubing 10 comprises an outer layer 12 consisting essentially of a thermoplastic material selected from the group consisting of 12 carbon block polyamides, 11 carbon block polyamides, thermoplastic elastomers, and mixtures thereof; an inner layer 14 consisting essentially of a thermoplastic material selected from the group consisting of polyvinylidine fluoride, polyvinyl fluoride, and mixtures thereof; and an intermediate bonding layer 16 consisting essentially of an extrudable thermoplastic capable of sufficiently permanent laminar adhesion to the polyamide outer layer 12 selected from the group consisting of polyvinylidine fluoride, polyvinyl fluoride, and mixtures thereof.

In summary, the second embodiment of the multi-layer tubing 10 comprises an outer layer 12 consisting essentially of a thermoplastic material selected from the group consisting of 12 carbon block polyamides, 11 carbon block polyamides, thermoplastic elastomers, and mixtures thereof; an inner layer 14 consisting essentially of a thermoplastic material selected from the group consisting of polychlorotrifluoroethylene, ethylene tetrafluoroethylene copolymers, and mixtures thereof; and an intermediate bonding layer 16 consisting essentially of an extrudable thermoplastic capable of sufficiently permanent laminar adhesion to the polyamide outer layer 12 selected from the group consisting of polyvinylidine fluoride, polyvinyl fluoride, blends of polyvinyl acetate and urethane, and mixtures thereof.

In summary, the third embodiment of the multi-layer tubing 10 comprises an outer layer 12 consisting essentially of a thermoplastic 6-carbon block polyamide; an inner layer 14 consisting essentially of a thermoplastic material selected from the group consisting of polychlorotrifluoroethylene, ethylene tetrafluoroethylene copolymers, and mixtures thereof; and an intermediate bonding layer 16 consisting essentially of an extrudable thermoplastic capable of sufficiently permanent laminar adhesion to the polyamide outer layer and selected from the group consisting of polyvinylidine fluoride, polyvinyl fluoride, blends of polyvinyl acetate and urethane, and mixtures thereof.

In summary, the fourth embodiment of the multi-layer tubing 10 comprises an outer layer 12 consisting essentially of a thermoplastic material selected from the group consisting of 12 carbon block polyamides, 11 carbon block polyamides, zinc chloride resistant 6 carbon block polyamides, thermoplastic elastomers, and mixtures thereof; a polyamide inner layer 14 selected from the group consisting essentially of a thermoplastic material selected from the group consisting of 12 carbon block polyamides, 11 carbon block polyamides, zinc chloride resistant 6 carbon block polyamides, thermoplastic elastomers, and mixtures thereof; and an intermediate bonding layer 16 consisting essentially of an extrudable thermoplastic capable of sufficiently permanent laminar adhesion to the outer and inner layers to prevent delamination during a desired lifetime of the multi-layer tubing, the bonding layer 16 being a polyester thermoplastic derived from ethylene glycol selected from the group consisting of polybutylene terephthalate, polyethylene terephthalate, polyteremethylene terephthalate, and mixtures thereof.

In summary, the fifth embodiment of the multi-layer tubing 10 comprises an outer layer 12 consisting essentially of a thermoplastic material selected from the group consisting of 12 carbon block polyamides, 11 carbon block polyamides, zinc chloride resistant 6 carbon block polyamides, thermoplastic elastomers, and mixtures thereof; an inner layer 14 consisting essentially of a thermoplastic material selected from the group consisting of polyvinylidine fluoride, polyvinyl fluoride, a graft copolymer of the preceding materials together with a fluorine-containing polymer such as copolymers of vinylidine fluoride and chlorotrifluoroethane, a copolymer of a vinyl fluoride and chlorotrifluoroethylene, the vinyl fluoride material selected from the group consisting of polyvinylidine fluoride, polyvinyl fluoride, and mixtures thereof; a copolymer of vinyl fluoride material and ethylene tetrafluoroethylene; and a non-fluorinated elastomer, and mixtures thereof; and an intermediate bonding layer 16 consisting essentially of an extrudable thermoplastic capable of sufficiently permanent laminar adhesion to the outer layer 12 and inner layer 14, the bonding layer 16 being a polyvinyl fluoride compound selected from the group consisting of polyvinylidine fluoride polymers, polyvinyl fluoride polymers, and mixtures thereof; a vinylidine fluoride-chlorotrifluoroethylene copolymer; and a polyamide material selected from the group consisting of 12 carbon block polyamides, 11 carbon block polyamides, 6 carbon block polyamides, and mixtures thereof.

In summary, the sixth embodiment of the multi-layer tubing 10 comprises an outer layer 12 consisting essentially of a thermoplastic 6-carbon block polyamide; an inner layer 14 consisting essentially of a thermoplastic 6-carbon block polyamide; and an intermediate bonding layer 16 consisting essentially of an extrudable thermoplastic capable of sufficiently permanent laminar adhesion to the outer layer 12 and inner layer 14, the bonding layer 16 selected from the group consisting of co-polymers of substituted or unsubstituted alkenes having less than four carbon atoms and vinyl alcohol, alkenes having less than four carbon atoms and vinyl acetate, and mixtures thereof.

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. An elongated multi-layer tubing for connection to a motor vehicle system to handle fluids containing hydrocarbons, the elongated multi-layer tubing comprising:

a first layer disposed radially innermost and having an inner surface capable of prolonged exposure to a fluid containing hydrocarbons and an outer surface spaced a first predetermined radial thickness from the inner surface, the first layer consisting essentially of an extrudable, melt-processible thermoplastic;

a second layer having a second predetermined radial thickness at most equal to the thickness of the first layer, the second layer uniformly connected to the first layer and consisting essentially of an extrudable, melt-processible thermoplastic capable of sufficiently permanent laminar adhesion with the first layer to prevent delamination during a desired lifetime of said tubing, wherein the melt-processible thermoplastic employed in at least one of the first and second layers is resistant to permeation by hydrocarbons;

a third layer having a third predetermined radial thickness greater than the thickness of the first layer, the third layer uniformly connected to the second layer and consisting essentially of an extrudable, melt-processible thermoplastic capable of sufficiently permanent laminar adhesion to the second layer to prevent delamination during said desired lifetime of said tubing; and wherein the melt-processible thermoplastic employed in at least one layer of said tubing dissipates electrostatic energy in a range between about $10^{-4}$ to $10^{-9}$ Ohm/cm$^2$; and wherein the thermoplastic material in the second layer is chemically dissimilar to the thermoplastic material employed in the third layer.

2. The tubing of claim 1 wherein the melt-processible thermoplastic employed in at least one of the first and second layers is sufficient to provide the tubing with a passive hydrocarbon permeation rate less than about 0.5 g/m$^2$ in a 24 hour interval.

3. The tubing of claim 1 wherein the extrudable melt-processible thermoplastic employed in the third layer together with the melt-processible thermoplastic employed in the first and second layers has characteristics which upon integral lamination provide tubing having a tensile strength of at least 25 N/mm$^2$ and a burst strength at 23° C. and 120° C. of at least 20 bar.

4. The tubing of claim 1 wherein the extrudable melt-processible thermoplastic employed in the first, second and third layers respectively has characteristics which upon integral lamination provides tubing having an elongation at break of at least 150%.

5. The tubing of claim 1 wherein the extrudable melt-processible thermoplastic employed in the third layer is an impact-modified polyamide material having an ability to resist impacts of at least 2 foot-pounds at temperatures below about −20° C.

6. The tubing of claim 1 wherein the melt-processible thermoplastic employed in at least one layer contains quantities of a conductive material sufficient to provide electrostatic dissipation capability in a range between about $10^{-4}$ to $10^{-9}$ Ohm/cm$^2$.

7. The tubing of claim 6 wherein the conductive material is selected from the group consisting of elemental carbon, copper, silver, gold, nickel, silicon, and mixtures thereof.

8. The tubing of claim 6 wherein the conductive material is present in an amount less than about 5% by volume of the melt-processible thermoplastic employed in at least one layer.

9. The tubing of claim 6 wherein the conductive material is blended into the melt-processible thermoplastic employed in at least one layer.

10. The tubing of claim 6 wherein the conductive material is elemental carbon and is incorporated during polymerization of monomers that make up the melt-processible thermoplastic employed in at least one layer.

11. The tubing of claim 1 wherein the extrudable melt-processible thermoplastic employed in the first layer is selected from the group consisting of Nylon 11, Nylon 12, zinc chloride resistant Nylon 6, thermoplastic elastomers, and mixtures thereof.

12. The tubing of claim 1 wherein the extrudable melt-processible thermoplastic employed in the first layer is a fluoroplastic material selected from the group consisting of polyvinylidine fluoride, polyvinyl fluoride, and mixtures thereof.

13. The tubing of claim 1 wherein the extrudable melt-processible thermoplastic employed in the second layer is a polyester thermoplastic selected from the group consisting of polybutylene terephthalate, polyethylene terephthalate, polyteremethylene terephthalate, and mixtures thereof.

14. The tubing of claim 1 wherein the extrudable melt-processible material employed in the second layer consists essentially of a thermoplastic selected from the group consisting of polyvinylidine fluoride, polyvinyl fluoride, blends of polyvinyl acetate and urethane, and mixtures thereof.

15. The tubing of claim 1 wherein the extrudable, melt-processible material employed in the second layer is a thermoplastic selected from the group consisting of co-polymers of alkenes having less than four carbon atoms and vinyl alcohol, copolymers of alkenes having less than four carbon atoms and vinyl acetate, and mixtures thereof.

16. The tubing of claim 1 wherein the extrudable, melt-processible material employed in the third layer is selected from the group consisting of Nylon 11, Nylon 12, zinc chloride resistant Nylon 6, thermoplastic elastomers, and mixtures thereof.

17. The tubing of claim 1 further comprising:

a fourth layer defining a jacket overlying the third layer, the jacket composed of a material consisting essentially of a thermoplastic material selected from the group consisting of Nylon 11, Nylon 12, zinc chloride resistant Nylon 6, polypropylene, thermoplastic elastomers, and mixtures thereof.

18. The tubing of claim 1 wherein the extrudable melt-processible thermoplastic employed in the first layer is a fluoropolymer selected from the group consisting of polychlorotrifluoroethylene, ethylene tetrafluoroethylene copolymers, and mixtures thereof.

19. The tubing of claim 1 further comprising:

a fourth layer defining a jacket overlying the third layer, the jacket composed of a material consisting essentially of a thermoplastic material selected from the group consisting of polyporpylene, thermoplastic elastomers, and mixtures thereof.

20. An elongated multi-layer tubing for connection to a motor vehicle system to handle fluids containing hydrocarbons comprising:

a first layer disposed radially innermost and having an inner surface capable of prolonged exposure to a fluid containing hydrocarbons and an outer surface spaced a first predetermined radial thickness from the inner surface, the first layer consisting essentially of an extrudable, melt-processible thermoplastic;

a second layer having a second predetermined radial thickness at most equal to the thickness of the first layer, the second layer homogeneously connected to the first layer and consisting essentially of an extrudable, melt-processible thermoplastic capable of sufficiently permanent laminar adhesion with the first layer to prevent delamination during a desired lifetime of said tubing, at least one of the first and second layers resistant to permeation by hydrocarbons;

a third layer having a third predetermined radial thickness greater than the thickness of the first layer, the third layer homogeneously connected to the second layer and consisting essentially of an extrudable, melt-processible thermoplastic chemically dissimilar to the thermoplastic material employed in the second layer and capable of sufficiently permanent laminar adhesion to the second layer to prevent delamination during said desired lifetime of said tubing; and wherein the melt-processible thermoplastic material employed in the first, second, and third layers respectively upon lamination provides tubing which has a passive hydrocarbon permeation rate less than about 0.5 g/m$^2$ in a 24 hour interval, an elongation at break of at least 150%, an ability to resist impacts of at least 2 foot-pounds at temperatures below about -20° C., a tensile strength of at least 25 N/mm$^2$ and a burst strength at 23° C. and 120° C. of at least 20 bar; and wherein the extrudable, melt-processible thermoplastic material employed in the second layer is selected from the group consisting of polyvinylidine fluoride polymers, polyvinyl polymers, blends of polyvinyl acetate and urethane, and mixture thereof.

21. The tubing of claim 20 wherein the melt-processible thermoplastic employed in at least one layer of said tubing dissipates electrostatic energy in a range between about $10^{-4}$ to $10^{-9}$ Ohm/cm$^2$.

22. The tubing of claim 21 wherein the melt-processible thermoplastic employed in at least one layer contains quantities of a conductive material sufficient to provide electrostatic dissipation capability in a range between about $10^{-4}$ to $10^{-9}$ Ohm/cm$^2$.

23. The tubing of claim 22 wherein the conductive material is selected from the group consisting of elemental carbon, copper, silver, gold, nickel, silicon, and mixtures thereof.

24. The tubing of claim 22 wherein the conductive material is present in an amount less than about 5% by volume of the melt-processible thermoplastic employed in at least one layer.

25. The tubing of claim 22 wherein the conductive material is blended into the thermoplastic material employed in at least one layer.

26. The tubing of claim 22 wherein the conductive material is elemental carbon and is incorporated during polymerization of monomers that make up the melt-processible thermoplastic employed in at least one layer.

27. The tubing of claim 20 wherein the material employed in the first layer and third layers are chemically dissimilar materials, and wherein the thermoplastic material employed in the first layer is a fluoroplastic selected from the group consisting of polyvinylidine fluoride, polyvinyl fluoride, and mixtures thereof.

28. The tubing of claim 27 wherein the extrudible, melt-processible thermoplastic material employed in the third layer is selected from the group consisting of Nylon 11, Nylon 12, zinc chloride resistant Nylon 6, thermoplastic elastomers, and mixtures thereof.

29. The tubing of claim 20 further comprising:

a fourth layer defining a jacket overlying the third layer, the jacket composed of a material consisting essentially of a thermoplastic material selected from the group consisting of Nylon 11, Nylon 12, zinc chloride resistant Nylon 6, polypropylene, thermoplastic elastomers, and mixtures thereof.

30. The tubing of claim 20 wherein the extudable melt-processible thermoplastic materials employed in the first and third layers are chemically dissimilar materials, and wherein the thermoplastic material employed in the first layer is a fluoroplastic selected from the group consisting of polychlorotrifluoroethylene, ethylene tetrafluoroethylene copolymers, and mixtures thereof.

31. An elongated multi-layer tubing for connection to a motor vehicle system to handle fluids containing hydrocarbons comprising:

a first layer disposed radially innermost and having an inner surface capable of prolonged exposure to a fluid containing hydrocarbons and an outer surface spaced a first predetermined radial thickness from the inner surface, the first layer consisting essentially of an extrudable, melt-processible thermoplastic;

a second layer having a second predetermined radial thickness at most equal to the thickness of the first layer, the second layer homogeneously connected to the first layer and consisting essentially of an extrudable, melt-processible thermoplastic capable of sufficiently permanent laminar adhesion with the first layer to prevent delamination during a desired lifetime of said tubing, at least one of the first and second layers resistant to permeation by hydrocarbons;

a third layer having a third predetermined radial thickness greater than the thickness of the first layer, the third layer homogeneously connected to the second layer and consisting essentially of an extrudable, melt-processible thermoplastic chemically dissimilar to the thermoplastic material employed in the second layer and capable of sufficiently permanent laminar adhesion to the second layer to prevent delamination during said desired lifetime of said tubing; and wherein the extrudable, melt-processible thermoplastic material employed in the second layer is a polyester thermoplastic selected from the group consisting of polybutylene terephthalate, polyethylene terephthalate, polyteremethylene terephthalate, and mixtures thereof.

32. The tubing of claim 31 wherein the first and third layers are composed of chemically similar materials, the chemically similar material being an extrudable, melt-processible thermoplastic selected from the group consisting of Nylon 11, Nylon 12, zinc chloride resistant Nylon 6, thermoplastic elastomers, and mixtures thereof.

33. An elongated multi-layer tubing for connection to a motor vehicle system to handle fluids containing hydrocarbons comprising:

a first layer disposed radially innermost and having an inner surface capable of prolonged exposure to a fluid containing hydrocarbons and an outer surface spaced a first predetermined radial thickness from the inner surface, the first layer consisting essentially of an extrudable, melt-processible thermoplastic;

a second layer having a second predetermined radial thickness at most equal to the thickness of the first layer, the second layer homogeneously connected to the first layer and consisting essentially of an extrudable, melt-processible thermoplastic capable of sufficiently permanent laminar adhesion with the first layer to prevent delamination during a desired lifetime of said tubing, at least one of the first and second layers resistant to permeation by hydrocarbons;

a third layer having a third predetermined radial thickness greater than the thickness of the first layer, the third layer homogeneously connected to the second layer and consisting essentially of an extrudable, melt-processible thermoplastic chemically dissimilar to the thermoplastic material employed in the second layer and capable of sufficiently permanent laminar adhesion to the second layer to prevent delamination during said desired lifetime of said tubing;

wherein the extrudable, melt-processible thermoplastic material employed in the first and third layers is zinc chloride resistant Nylon 6 and the thermoplastic material employed in the second layer is selected from the group consisting of co-polymers of alkenes having less than four carbon atoms and vinyl alcohol, copolymers of alkenes having less than four carbon atoms and vinyl acetate, and mixtures thereof.

* * * * *

UNITED STATES PATENT AND TRADEMARK OFFICE
CERTIFICATE OF CORRECTION

PATENT NO. : 5,524,673
DATED : June 11, 1996
INVENTOR(S) : David L. Noone, Frank L. Mitchell and Peter Wenig It is certified that error appears in the above-identified patent and that said Letters Patent is hereby corrected as shown below:

In the Abstract, final line, delete "$10^{-4}$ to $10^{-9}$" and insert --$10^4$ to $10^9$--.

At Col. 3, line 29; Col. 8, line 28; Col. 9, line 45; Col. 10, line 27; Col. 15, line 7; Col. 19, line 35; Col. 19, lines 66-67; Col. 21, lines 38-39; and Col. 21, lines 43-44; delete "$10^{-4}$ to $10^{-9}$" and insert --$10^4$ to $10^9$--.

At Col. 3, lines 2-3, delete "discharge" and insert --charge--.

At Col. 8, line 26, delete "conductive" and insert --dissipative--.

At Col. 9, line 43, delete "conductive" and insert --electrostatically dissipative--.

Signed and Sealed this

Fifteenth Day of February, 2000

Attest:

Q. TODD DICKINSON

*Attesting Officer*    *Commissioner of Patents and Trademarks*